US010552830B2

(12) United States Patent
Khan et al.

(10) Patent No.: US 10,552,830 B2
(45) Date of Patent: Feb. 4, 2020

(54) DELETION OF CREDENTIALS FROM AN ELECTRONIC DEVICE

(71) Applicant: Apple Inc., Cupertino, CA (US)

(72) Inventors: Ahmer A. Khan, Cupertino, CA (US); Joakim Linde, Cupertino, CA (US); Christopher Sharp, Cupertino, CA (US); Jerrold V. Hauck, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 362 days.

(21) Appl. No.: 14/475,292

(22) Filed: Sep. 2, 2014

(65) Prior Publication Data

US 2015/0178723 A1    Jun. 25, 2015

Related U.S. Application Data

(60) Provisional application No. 61/920,029, filed on Dec. 23, 2013.

(51) Int. Cl.
| | |
|---|---|
| G06Q 20/32 | (2012.01) |
| G06Q 20/38 | (2012.01) |
| H04W 12/08 | (2009.01) |
| H04W 12/00 | (2009.01) |

(52) U.S. Cl.
CPC ..... *G06Q 20/3821* (2013.01); *G06Q 20/3226* (2013.01); *G06Q 20/3278* (2013.01); *H04W 12/0023* (2019.01); *H04W 12/0802* (2019.01); *H04W 12/0806* (2019.01)

(58) Field of Classification Search
None
See application file for complete search history.

(56) References Cited

U.S. PATENT DOCUMENTS

| | | | |
|---|---|---|---|
| 8,196,131 B1* | 6/2012 | von Behren | G06Q 20/367 705/64 |
| 9,317,704 B2* | 4/2016 | Brudnicki | G06F 21/604 |
| 2002/0040936 A1* | 4/2002 | Wentker | G06F 8/60 235/492 |
| 2012/0130838 A1* | 5/2012 | Koh | G06Q 20/352 705/26.1 |
| 2012/0238207 A1* | 9/2012 | Marcovecchio | H04L 63/0492 455/41.1 |

(Continued)

FOREIGN PATENT DOCUMENTS

WO    2013/067521    5/2013

*Primary Examiner* — Fatoumata Traore
(74) *Attorney, Agent, or Firm* — Morgan, Lewis & Bockius LLP

(57) ABSTRACT

Systems, methods, and computer-readable media for managing credentials are provided. In one example embodiment, an electronic device may include a secure element with a security domain element stored on the secure element. The electronic device may also include a processor component that may be configured to, inter alia, permanently terminate the functionality of the security domain element, after the functionality has been permanently terminated, communicatively couple the electronic device to a trusted service manager, and transmit data to the communicatively coupled trusted service manager that may be usable by the trusted service manager to determine that the functionality has been permanently terminated. Additional embodiments are also provided.

33 Claims, 6 Drawing Sheets

(56) References Cited

U.S. PATENT DOCUMENTS

2012/0300932 A1* 11/2012 Cambridge ........... H04L 9/3234
380/270
2013/0109308 A1* 5/2013 Singh ..................... H04L 67/34
455/41.1

* cited by examiner

DELETION OF CREDENTIALS FROM AN ELECTRONIC DEVICE

CROSS-REFERENCE TO RELATED APPLICATION(S)

This application claims the benefit of prior filed U.S. Provisional Patent Application No. 61/920,029, filed Dec. 23, 2013, which is hereby incorporated by reference herein in its entirety.

TECHNICAL FIELD

This disclosure relates to the management of credentials on an electronic device and, more particularly, to the deletion of commerce credentials from an electronic device.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential or a public transportation ticket credential, previously provisioned on the device. However, the deletion of such commerce credentials from an electronic device is often inconvenient.

SUMMARY OF THE DISCLOSURE

This document describes systems, methods, and computer-readable media for deleting credentials from an electronic device capable of near field communications and/or other wireless communications.

For example, an electronic device may include a secure element that includes a security domain element stored on the secure element. The electronic device may also include a processor component configured to permanently terminate the functionality of the security domain element, after the functionality has been permanently terminated, communicatively couple the electronic device to a trusted service manager, and transmit data to the communicatively coupled trusted service manager that may be usable by the trusted service manager to determine that the functionality has been permanently terminated.

As another example, a financial institution system in communication with an electronic device may be provided that includes at least one processor component, at least one memory component, and at least one communications component. The financial institution system may be configured to provision a security domain element on the electronic device, after the security domain element is provisioned on the electronic device, receive shared data from the electronic device, and use the received shared data to determine that the functionality of the security domain element has been permanently terminated on the electronic device.

As yet another example, an electronic device may be provided that includes a secure element with a security domain element stored on the secure element, and a processor component configured to irreversibly end the ability of the electronic device to share information indicative of the security domain element with at least one of a user of the electronic device and a remote merchant subsystem, after the ability has been irreversibly ended, communicatively couple the electronic device to a trusted service manager, and transmit data to the communicatively coupled trusted service manager that is usable by the trusted service manager to determine that the ability has been irreversibly ended.

As yet another example, a method may include terminating the functionality of a security domain element on an electronic device while the electronic device is not communicatively coupled to a trusted service manager of the security domain element, after the terminating, communicatively coupling the electronic device to the trusted service manager, and communicating data from the electronic device to the communicatively coupled trusted service manager, where the communicated data may be usable by the trusted service manager to determine that the functionality of the security domain element has been terminated on the electronic device.

As yet another example, a non-transitory computer-readable medium may include computer-readable instructions recorded thereon for terminating the functionality of a security domain element on an electronic device, after the terminating, communicatively coupling the electronic device to a trusted service manager, and communicating data from the electronic device to the communicatively coupled trusted service manager, where the communicated data may be usable by the trusted service manager to determine that the functionality of the security domain element has been terminated.

As yet another example, an electronic device may include a secure element with a security domain element stored on the secure element, and a processor component configured to terminate the functionality of the security domain element without any communication between the electronic device and any remote entity.

As yet another example, an electronic device may include a secure element with a security domain element stored on the secure element, and a processor component configured to terminate the functionality of the security domain element independent of any communication between the electronic device and a trusted service manager.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

The secure deletion of a commerce credential from an electronic device may be initiated when the electronic device is not communicatively coupled to a remote subsystem responsible for the management of that commerce credential. For example, while the electronic device is not communicatively coupled to the responsible remote subsystem, a life cycle state of the commerce credential may be updated locally on the electronic device such that the commerce credential may no longer be used by the electronic device in any commercial transaction and/or such that the existence of the commerce credential on the electronic device may no longer be indicated by the device to a user, and that updated life cycle state may later be shared with the responsible remote subsystem once the electronic device eventually is communicatively coupled to the responsible remote subsystem such that the responsible remote subsystem may take appropriate action to complete the secure deletion of the commerce credential from the electronic device. As another example, while the electronic device is not communicatively coupled to the responsible remote subsystem, the commerce credential may be deleted from the electronic device, and particular data may later be shared with the responsible remote subsystem once the electronic device eventually is communicatively coupled to the responsible remote subsystem that may be utilized by the responsible remote subsystem to identify the deletion.

Figure 1:
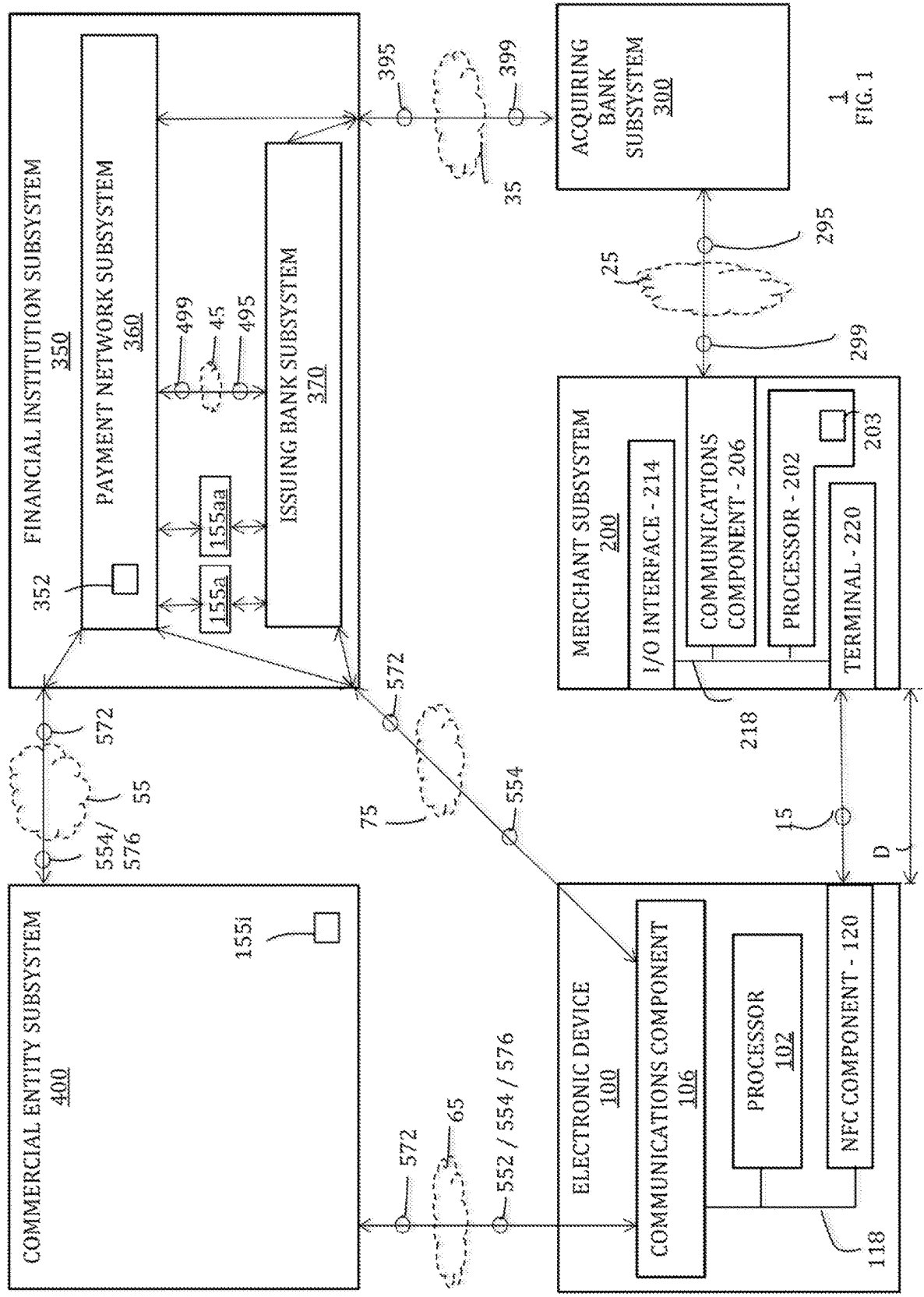
FIG. 1 is a schematic view of an illustrative system for managing credentials on an electronic device.
Figure 2:
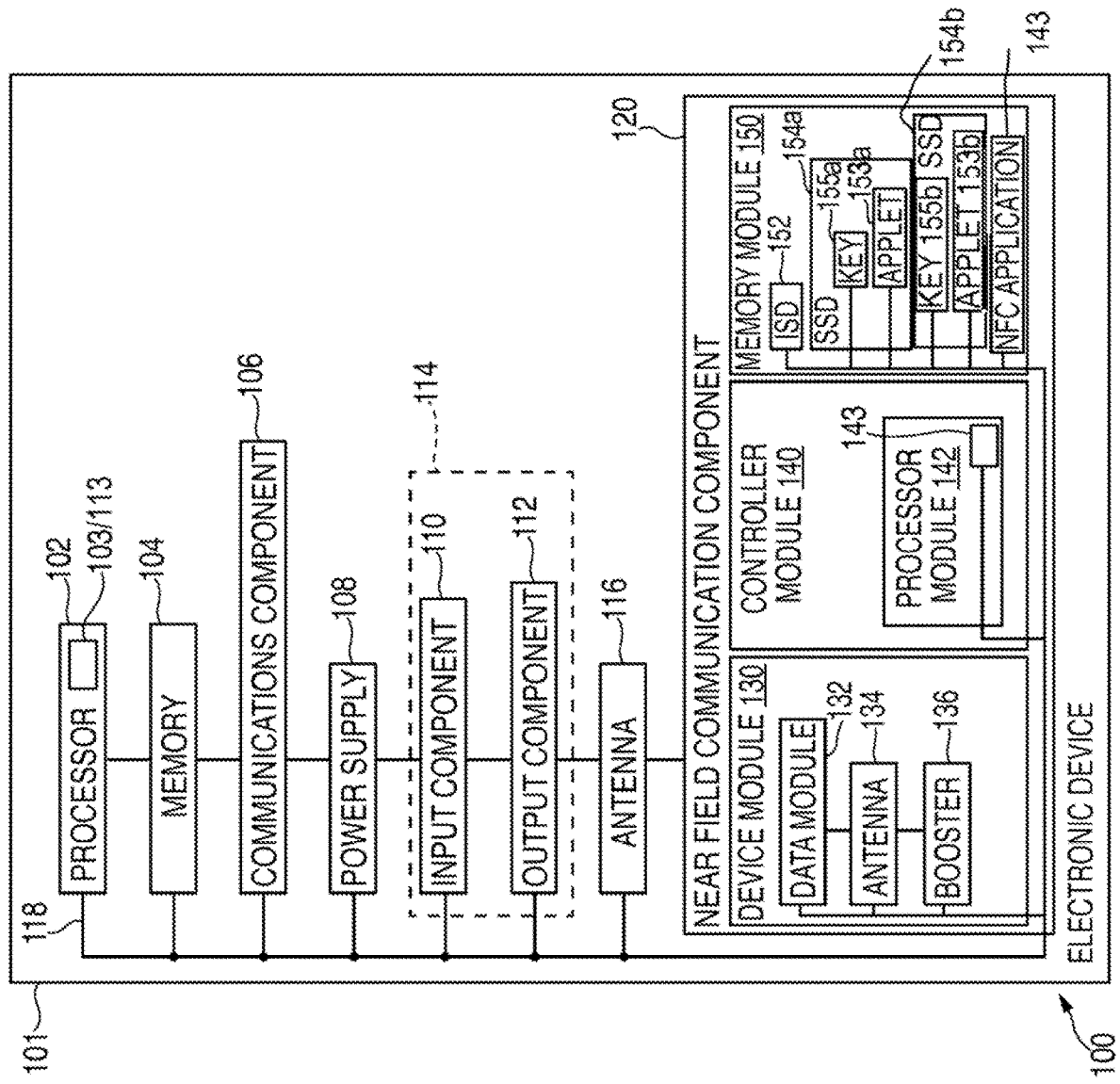
FIG. 2 is a more detailed schematic view of the electronic device of the system of FIG. 1.
Figure 3:
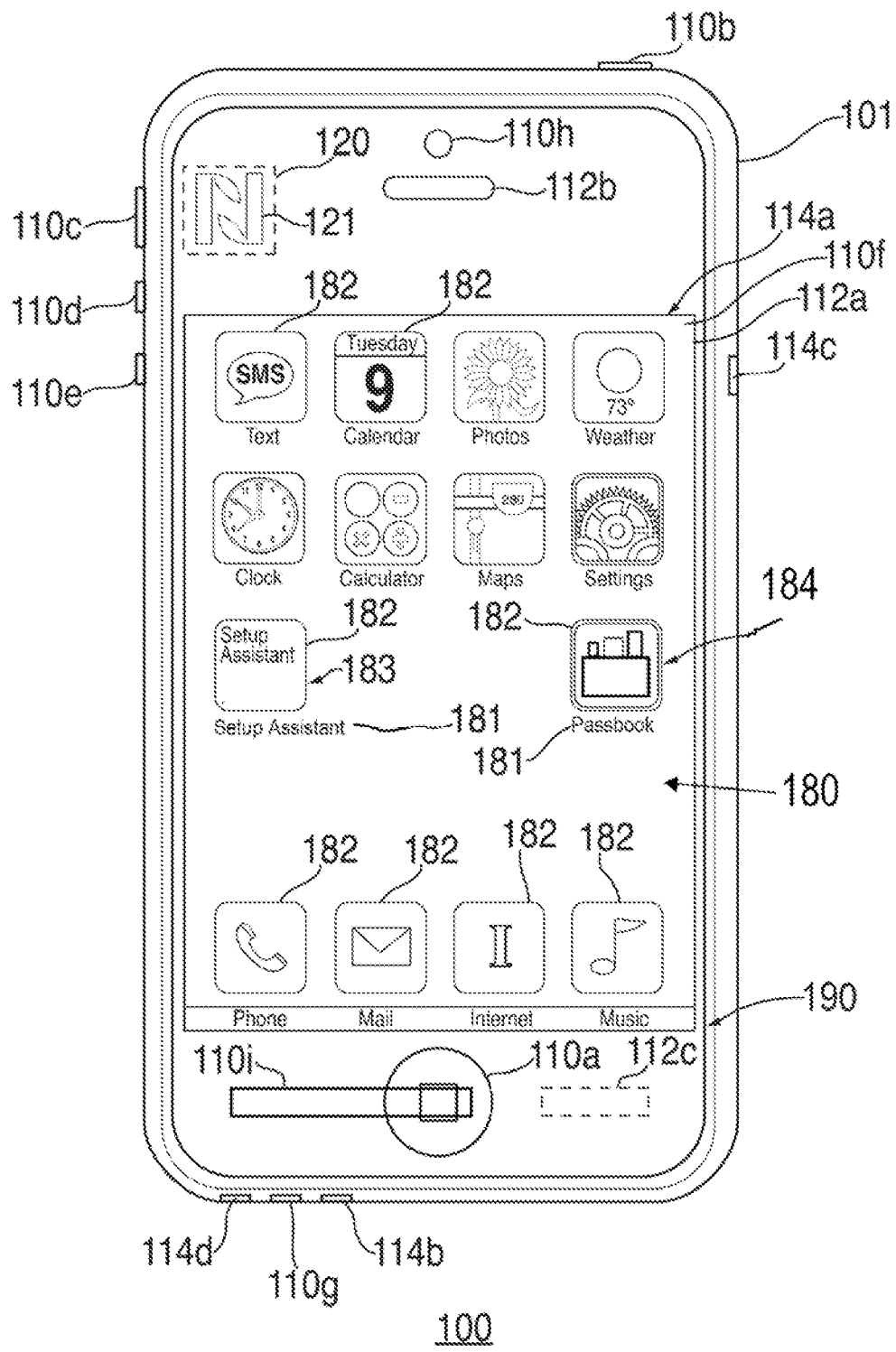
FIG. 3 is a front view of the electronic device of FIGS. 1 and 2.
Figure 4:
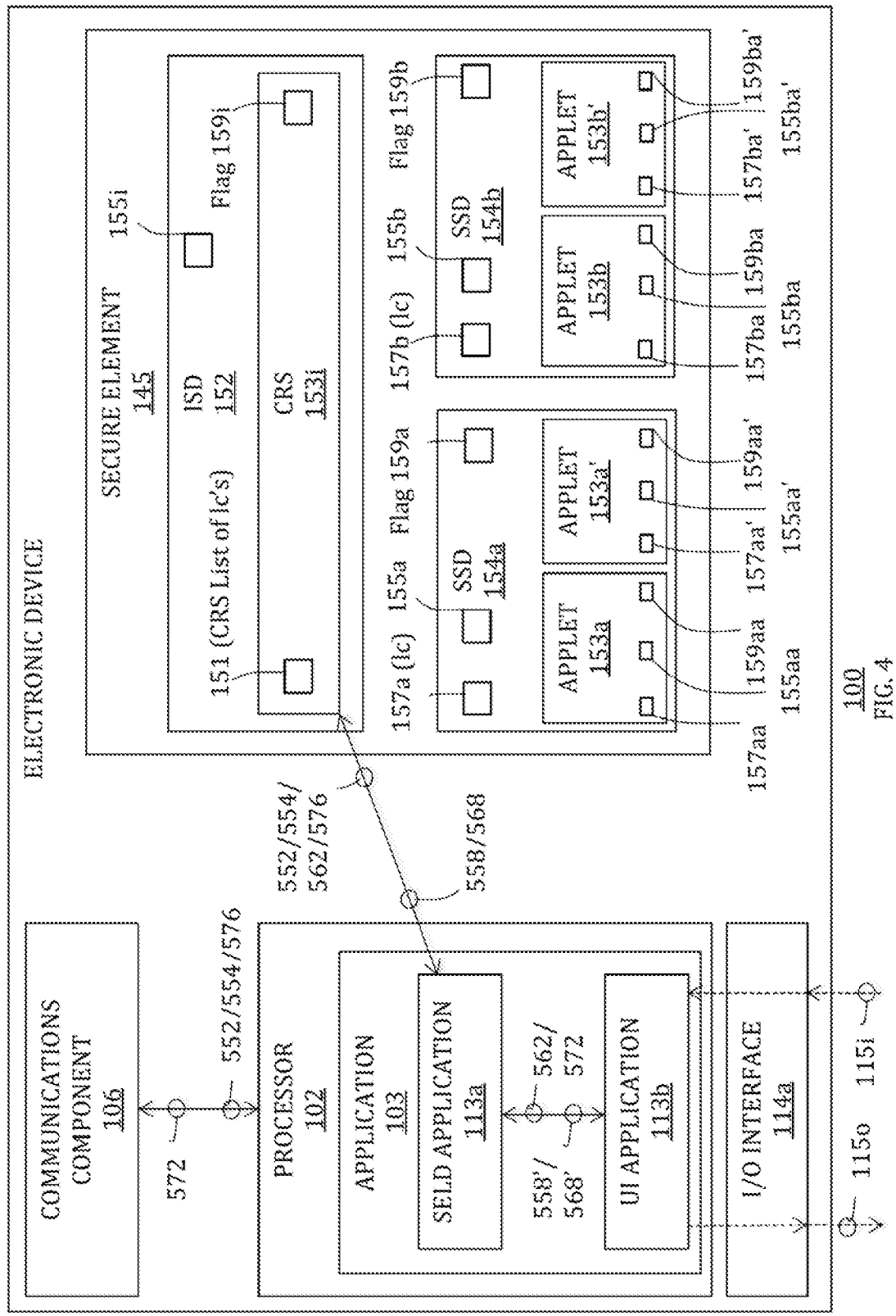
FIG. 4 is another more detailed schematic view of the electronic device of FIGS. 1-3.
Figure 5:
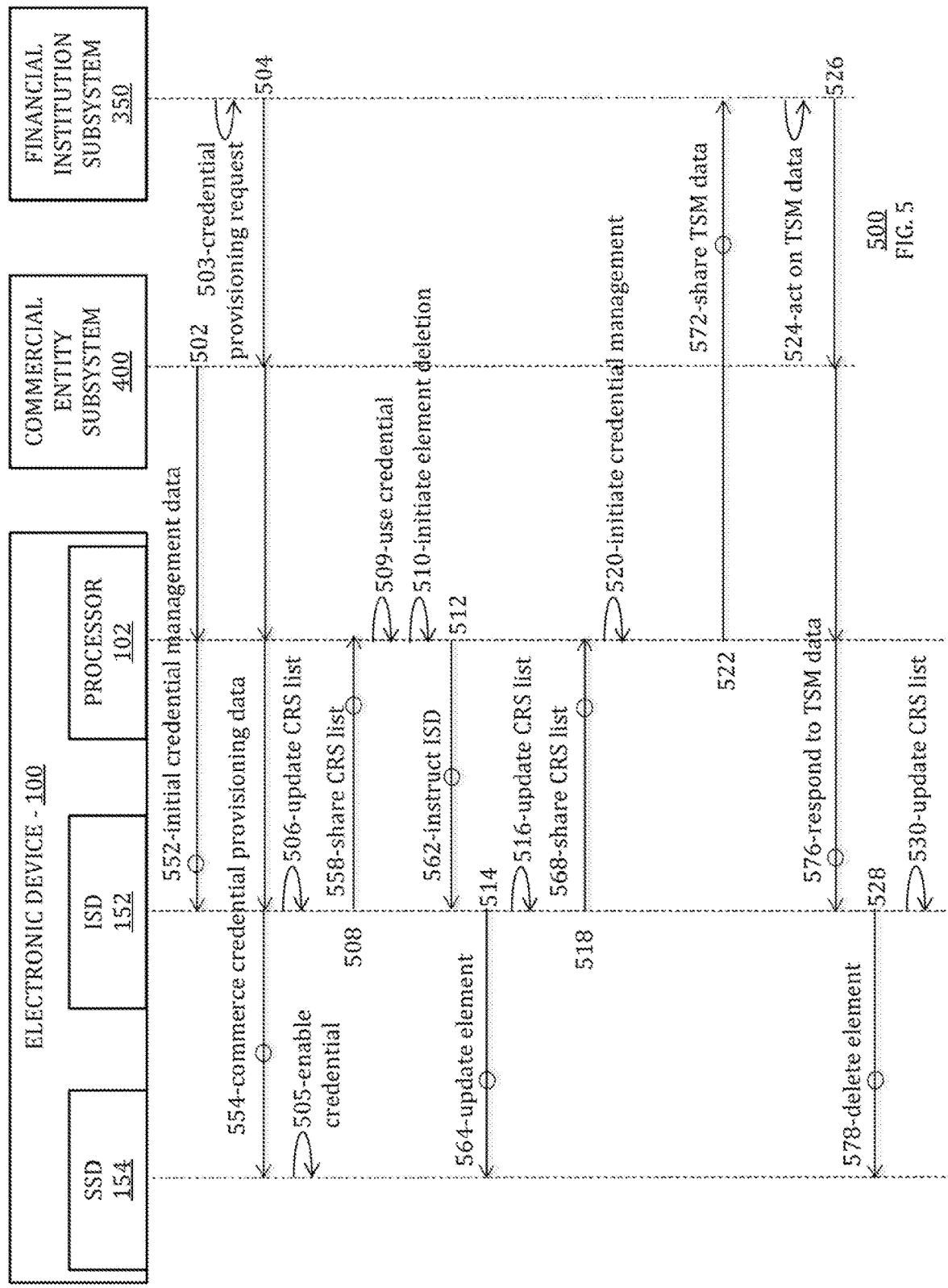
FIGS. 5 and 6 are flowcharts of illustrative processes for managing credentials on an electronic device.
Figure 6:
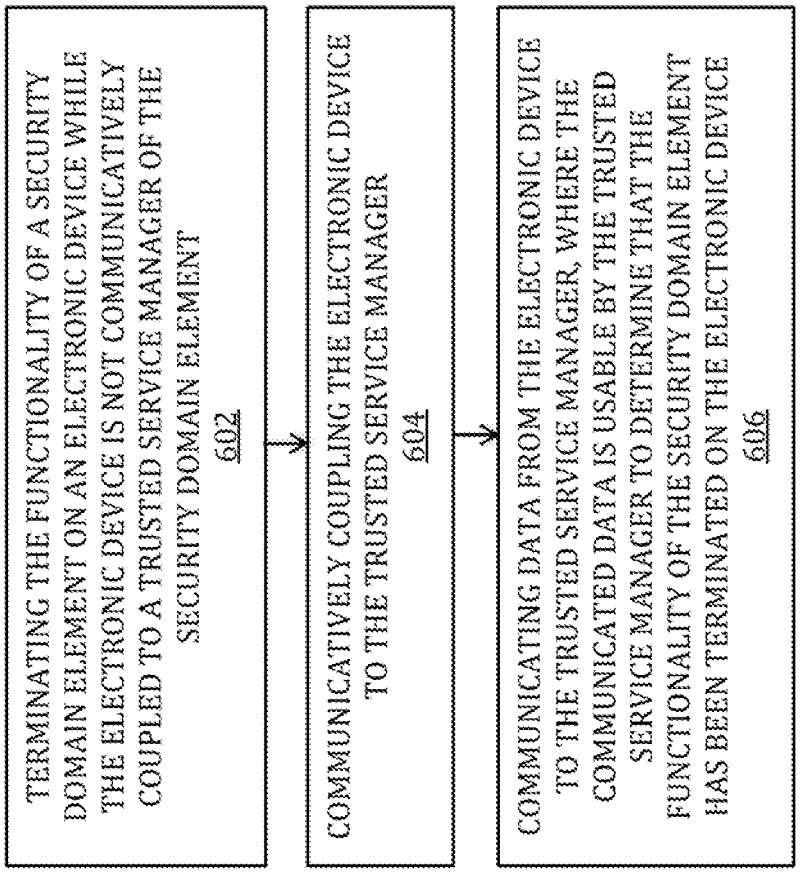

FIG. 1 shows a system 1 in which one or more credentials may be managed on an electronic device 100, such as credentials provisioned on and removed from electronic device 100 by a financial institution subsystem 350 (e.g., in conjunction with a commercial entity subsystem 400), and in which such credentials may be used by electronic device 100 for conducting a commercial transaction with a merchant subsystem 200 and an associated acquiring bank subsystem 300. FIGS. 2-4 show further details with respect to particular embodiments of electronic device 100 of system 1, while FIGS. 5 and 6 are flowcharts of illustrative processes for managing credentials on electronic device 100 in the context of system 1.

Description of FIG. 1, FIG. 2, FIG. 3, and FIG. 4

FIG. 1 is a schematic view of an illustrative system 1 that may allow for the management of credentials on an electronic device. For example, as shown in FIG. 1, system 1 may include an end-user electronic device 100 as well as a commercial entity subsystem 400 and a financial institution subsystem 350 for securely provisioning credentials on electronic device 100 and/or for securely deleting credentials from electronic device 100. Moreover, as shown in FIG. 1, system 1 may also include a merchant subsystem 200 for receiving contactless proximity-based communications 15 (e.g., near field communications) from electronic device 100 based on such provisioned credentials, as well as an acquiring bank subsystem 300 that may utilize such contactless proximity-based communications 15 for completing a transaction with financial institution subsystem 350.

As shown in FIG. 2, and as described in more detail below, electronic device 100 may include a processor 102, memory 104, communications component 106, power supply 108, input component 110, output component 112, antenna 116, and near field communication ("NFC") component 120, where input component 110 and output component 112 may sometimes be a single I/O component or I/O interface 114, such as a touch screen, that may receive input information through a user's touch of a display screen and that may also provide visual information to a user via that same display screen. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. Processor 102 may be used to run one or more applications, such as an application 103 and/or an application 113. Each one of applications 103 and 113 may include, but is not limited to, one or more operating system applications, firmware applications, media playback applications, media editing applications, communication applications, NFC applications, biometric feature-processing applications, or any other suitable applications. For example, processor 102 may load an application 103/113 as a user interface program to determine how instructions or data received via an input component 110 or other component of device 100 may manipulate the way in which information may be stored and/or provided to the user via an output component 112. As one example, application 103 may be an operating system application while application 113 may be a third party application (e.g., an application associated with a merchant of merchant subsystem 200 and/or an application associated with a financial institution of financial institution subsystem 350 and/or an application generated and/or maintained by commercial entity subsystem 400).

NFC component 120 may be any suitable proximity-based communication mechanism that may enable any suitable contactless proximity-based transactions or communications 15 between electronic device 100 and merchant subsystem 200 (e.g., a merchant payment terminal 220 of merchant subsystem 200). NFC component 120 may include any suitable modules for enabling contactless proximity-based communication 15 between electronic device 100 and subsystem 200. As shown in FIG. 2, for example, NFC component 120 may include an NFC device module 130, an NFC controller module 140, and an NFC memory module 150. NFC device module 130 may include an NFC data module 132, an NFC antenna 134, and an NFC booster 136. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communication 15 between electronic device 100 and merchant subsystem 200. NFC memory module 150 may be tamper resistant and may provide at least a portion of a secure element 145 (see, e.g., FIG. 4). For example, such a secure element 145 may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIGS. 2 and 4, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, etc.) on electronic device 100 (e.g., via communications component 106), for credential content management, and/or for security domain management. A specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155a and 155b) and at least one of its own credential applications or credential applets (e.g., a Java card applet instances) associated with a particular commerce credential (e.g., credential applets 153a and 153a' of SSD 154a and credential applets 153b and 153b' of SSD 154b), where a credential applet may have its own applet key (e.g., applet key 155aa for credential applet 153a, applet key 155aa' for credential applet 153a', applet key 155ba for credential applet 153b, and applet key 155ba' for credential applet 153b') and where a credential applet may need to be activated to enable its associated commerce credential for use by NFC device module 130 as an NFC communication 15 between electronic device 100 and merchant subsystem 200.

As also shown in FIG. 4, for example, ISD 152 may include a key 155i that may also be known to a trusted service manager associated with that security domain (e.g., commercial entity subsystem 400, as shown in FIG. 1). Moreover, as also shown in FIG. 4, ISD 152 may also include or be in any way associated with a contactless registry services ("CRS") applet or application 153i that may be configured to provide local functionality to electronic device 100 for modifying the life cycle state 157 (e.g., activated, deactivated, locked, etc.) of certain security domain elements and sharing certain output information 115o about certain security domain elements in certain life cycle states with a user of device 100 (e.g., via a user I/O interface 114a). For example, as shown, CRS application 153i may include a CRS list 151 that may maintain a list of the current life cycle state of each security domain element on secure element 145 (e.g., life cycle state 157a of SSD 154a, life cycle state 157aa of credential applet 153a, life cycle state 157aa' of credential applet 153a', life cycle state 157b of SSD 154b, life cycle state 157ba of credential applet 153b, and life cycle state 157ba' of credential applet 153b'), where CRS application 153i may be configured to share the life cycle state of one or more security domain elements of secure element 145 with an application of device 100 (e.g., with a secure element daemon ("SELD") application 113a that may be running as a background process inside an operating system application 103 but that may not be under the control of an interactive user of device 100), which in turn may provide certain life cycle state information with a user of device 100 as output information 115o via I/O interface 114a and a user interface ("UI") application (e.g., UI application 113b, such as a "wallet application", as described below), which may enable a user to change a life cycle state of a security domain element (e.g., to update CRS list 151 and a life cycle state 157 of a security domain element, such as for enabling a commerce credential of a specific credential applet for use in an NFC communication 15).

As shown in FIG. 3, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180 (e.g., with output information 115o), which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner according to that application. As another example, when the specific icon 182 labeled with a "Passbook" textual indicator 181 (i.e., specific icon 184) is selected, device 100 may launch or otherwise access a specific "Passbook" or "wallet" application and may display screens of a specific user interface that may include one or more tools or features for interacting with device 100 in a specific manner according to that application.

Referring back to system 1 of FIG. 1, merchant subsystem 200 may include a reader or terminal 220 for detecting, reading, or otherwise receiving NFC communication 15 from electronic device 100 (e.g., when electronic device 100 comes within a certain distance or proximity D of terminal 220). Accordingly, it is noted that NFC communication 15 between merchant terminal 220 and electronic device 100 may occur wirelessly and, as such, may not require a clear "line of sight" between the respective devices. NFC device module 130 may be passive or active. When passive, NFC device module 130 may only be activated when within a response range D of a suitable terminal 220 of merchant subsystem 200. For instance, terminal 220 of merchant subsystem 200 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to terminal 220 of merchant subsystem 200 as NFC communication 15. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to terminal 220 of merchant subsystem 200 as NFC communication 15, rather than reflect radio frequency signals, as in the case of a passive NFC device module 130. As also shown in FIG. 1, and as described below in more detail, merchant subsystem 200 may also include a merchant processor component 202 that may be the same as or similar to a processor component 102 of electronic device 100, a merchant application 203 that may be the same as or similar to an application 103/113 of electronic device 100, a merchant communications component 206 that may be the same as or similar to a communications component 106 of electronic device 100, a merchant I/O interface 214 that may be the same as or similar to an I/O interface 114 of electronic device 100, a merchant bus 218 that may be the same as or similar to a bus 118 of electronic device 100, a merchant memory component (not shown) that may be the same as or similar to a memory component 104 of electronic device 100, and/or a merchant power supply component (not shown) that may be the same as or similar to a power supply component 108 of electronic device 100.

When NFC component 120 is appropriately enabled and activated to communicate NFC communication 15 to merchant subsystem 200 with commerce credential data associated with an enabled credential of device 100 (e.g., commerce credential data associated with enabled and activated applet 153a of SSD 154a of NFC component 120), acquiring bank subsystem 300 may utilize such commerce credential data of NFC communication 15 for completing a commercial or financial transaction with financial institution subsystem 350. Financial institution subsystem 350 may include a payment network subsystem 360 (e.g., a payment card association or a credit card association) and/or an issuing bank subsystem 370. For example, issuing bank subsystem 370 may be a financial institution that assumes primary liability for a consumer's capacity to pay off debts they incur with a specific credential. Each specific credential may be associated with a specific payment card that may be electronically linked to an account or accounts of a particular user. Various types of payment cards are suitable, including credit cards, debit cards, charge cards, stored-value cards, fleet cards, gift cards, and the like. The commerce credential of a specific payment card may be provisioned on electronic device 100 by issuing bank subsystem 370 for use in an NFC communication 15 with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand. Alternatively or additionally, certain credentials that may be provisioned on device 100 for use in a commercial or financial transaction may be electronically linked to or otherwise associated with an account or accounts of a particular user, but not associated with any payment card. For example, a bank account or other financial account of a user may be associated with a credential provisioned on device 100 but may not be associated with any payment card.

Payment network subsystem 360 and issuing bank subsystem 370 may be a single entity or separate entities. For example, American Express may be both a payment network subsystem 360 and an issuing bank subsystem 370. In contrast, Visa and MasterCard may be payment network subsystems 360, and may work in cooperation with issuing bank subsystems 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

To facilitate transactions within system 1, one or more commerce credentials may be provisioned on electronic device 100. As shown in FIG. 1, commercial entity subsystem 400 may be provided within system 1, where commercial entity subsystem 400 may be configured to provide a new layer of security and/or to provide a more seamless user experience when it is being determined whether or not to provision a credential from financial institution subsystem 350 on device 100 and/or whether or not to remove a credential from device 100. Commercial entity subsystem 400 may be provided by a specific commercial entity that may offer various services to a user of device 100. As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, or the like). Additionally or alternatively, commercial entity subsystem 400 may be provided by a network operator (e.g., a mobile network operator, such as Verizon or AT&T, which may have a relationship with a user of device 100 (e.g., a data plan for enabling the communication of data over a certain communication path and/or using a certain communication protocol with device 100)).

The commercial entity that may provide, manage, or at least partially control commercial entity subsystem 400 may also provide different users with their own personalized accounts for using the services offered by that commercial entity. Each user account with the commercial entity may be associated with a specific personalized user ID and password that a user may use to log-in to their account with the commercial entity. Each user account with the commercial entity may also be associated with or have access to at least one commerce credential that can then be used by the user for purchasing services or products offered by the commercial entity. For example, each Apple ID user account may be associated with at least one credit card of a user associated with that Apple ID, such that the credit card may then be used by the user of that Apple ID account for procuring services from Apple's iTunes™ Store, the Apple App Store™, the Apple iCloud™ Service, and the like. The commercial entity that may provide, manage, or at least partially control commercial entity subsystem 400 (e.g., Apple Inc.) may be distinct and independent from any financial entity of financial institution subsystem 350. For example, the commercial entity that may provide, manage, or at least partially control commercial entity subsystem 400 may be distinct and independent from any payment network subsystem 360 or issuing bank subsystem 370 that may furnish and manage any credit card or other commerce credential associated with a user account of the commercial entity. Similarly, the commercial entity that may provide, manage, or at least partially control commercial entity subsystem 400 may be distinct and independent from any payment network subsystem 360 or issuing bank subsystem 370 that may furnish and manage any commerce credential to be provisioned on user device 100. Such a commercial entity may leverage the known commerce credential information associated with each of its user accounts and/or any suitable information that commercial entity subsystem 400 may determine about device 100 in order to more securely determine with commercial entity subsystem 400 whether a specific credential offered by financial institution subsystem 350 ought to be provisioned on a user device 100 or removed therefrom. Additionally or alternatively, such a commercial entity may leverage its ability to configure or control various components of device 100 (e.g., software and/or hardware components of device 100 when that commercial entity at least partially produces or manages device 100) in order to provide a more seamless user experience for a user of device 100 when he or she wants to provision a credential offered by financial institution subsystem 350 on device 100 or remove a credential therefrom.

Commercial entity subsystem 400 may be a secure platform system and, although not shown in FIG. 1, may include a secure mobile platform ("SMP") broker component, an SMP trusted services manager ("TSM") component, an SMP crypto services component, an identity management system ("IDMS") component, a fraud system component, a hardware security module ("HSM") component, and/or a store component, as described in more detail below. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience when managing credentials on device 100.

Description of FIG. 5

FIG. 5 is a flowchart of an illustrative process 500 for managing commerce credentials on an electronic device (e.g., for provisioning a credential on an electronic device and/or for deleting a credential from an electronic device). Process 500 is shown being implemented by the various elements of system 1 of FIGS. 1-4 (e.g., electronic device 100, financial institution subsystem 350, and commercial entity subsystem 400). However, it is to be understood that process 500 may be implemented using any other suitable components or subsystems. Process 500 may provide a seamless user experience for securely deleting or otherwise permanently disabling a credential previously provisioned on device 100 without requiring network connectivity between device 100 and a TSM (e.g., financial institution subsystem 350 and/or commercial entity subsystem 400). This may enable a user to remove a credential's functionality from device 100 permanently without first establishing a network connection between device 100 and a remote subsystem. This may be beneficial when a first user would like to remove certain credentials from device 100 before selling or otherwise transferring control of device 100 to a second user despite no network connectivity between device 100 and a trusted service manager of the credentials.

Process 500 may begin at step 502, where initial credential management data 552 may be provided on an electronic device. For example, ISD 152, which may include or otherwise be associated with ISD key 155i and CRS application 153i, may be provided on secure element 145 of NFC component 120 of electronic device 100 (e.g., by commercial entity subsystem 400) as at least a portion of initial credential management data 552, where such initial credential management data 552 may be utilized by NFC component 120 for initially configuring secure element 145 to manage the provisioning and/or deletion of one or more commerce credentials on secure element 145 by a remote subsystem. ISD key 155i may also remain accessible to commercial entity subsystem 400 (e.g., a copy of ISD key 155i may be stored on or otherwise used by commercial entity subsystem 400, as shown in FIG. 1). In such embodiments, commercial entity subsystem 400 may be considered a secure element issuer trusted service manager ("SEI-TSM"), and such initial credential management data 552 may be provided by commercial entity subsystem 400 to electronic device 100 via communications path 65 of FIG. 1. For example, communications component 106 of electronic device 100 may be configured to communicate such initial credential management data 552 with commercial entity subsystem 400 using any suitable communications protocol over any suitable communications path 65. Additionally or alternatively, SELD application 113a, UI application 113b, operating system application 103, and/or any other suitable applications may be made accessible to device 100 by commercial entity subsystem 400 (e.g., from a store component of commercial entity subsystem 400) as at least a portion of initial credential management data 552, where such initial credential management data 552 may be utilized by device 100 for enabling a user of device 100 to actively manage the life cycle states of various elements on secure element 145 (e.g., via I/O interface 114a).

Next, at step 503, process 500 may include system 1 receiving a request to provision a commerce credential on electronic device 100. For example, step 503 may include financial entity subsystem 350 receiving any suitable request for a particular commerce credential to be provisioned on device 100 (e.g., a request initiated by a user of device 100 via interaction with an application of device 100 (e.g., through user interaction with GUI 180 on I/O interface 114a of device 100, such as during use of a setup assistant application associated with "Setup Assistant" icon 183 and/or during use of a "Passbook" or "Wallet" application associated with "Passbook" icon 184 of FIG. 3), a request initiated by commercial entity subsystem 400, and/or a request generated by financial institution subsystem 350 itself). Such a request of credential provisioning may include any suitable identification information associated with the selected credential that may be used by financial institution subsystem 350 for provisioning that credential onto device 100 (e.g., the card verification value ("CVV") for the selected credential, the expiration date for the selected credential, the billing address for the selected credential, etc.). Moreover, such a request may include any other suitable information that may be useful for enabling the provisioning of the selected credential on device 100 (e.g., information associated with the target device 100, such as an SSD identifier, which may be indicative of an available SSD 154 of NFC component 120 of device 100 that may be able to receive such a provisioned credential).

Next, at step 504, process 500 may include provisioning the commerce credential identified at step 503 on an electronic device. For example, commerce credential provisioning data 554 may be communicated to electronic device 100 by financial institution subsystem 350 (e.g., via commercial entity subsystem 400) at step 504 for provisioning at least a first commerce credential applet 153a of a first SSD 154a on secure element 145 of electronic device 100. In such embodiments, financial institution subsystem 350 may be considered a service provider trusted service manager ("SP-TSM"). In response to receiving a request at step 503, various routines may occur at step 504 for provisioning a requested commerce credential on electronic device 100. For example, step 504 may include financial institution subsystem 350 (e.g., payment network subsystem 360) generating a descriptor of the selected credential to be provisioned, as well as visual artwork and/or other metadata that may be provided on device 100 for aiding user interaction with the credential once provisioned. Particularly, at step 504 of process 500 of FIG. 5, financial institution subsystem 350 may pull specific data from the credential provisioning request (e.g., the credential identification information for the credential requested at step 503), access one or more databases of information available to financial institution subsystem 350 that may be useful for generating one or more descriptors and/or various types of metadata that may aid any eventual user interaction with the credential once provisioned on device 100, and then generate and transmit at least a portion of commerce credential provisioning data 554 to device 100 (e.g., at least partially via commercial entity subsystem 400). For example, such commerce credential provisioning data 554 may include some or all suitable data that may enable device 100 to make the credential visually appear as available to device 100, such as visual logos/icons and other user discernible data associated with the credential that may be provided to the user (e.g., when the specific icon 182 labeled with a "Passbook" textual indicator 181 (i.e., specific icon 184) of FIG. 3 is selected, device 100 may launch or otherwise access a specific passbook or wallet application and may display screens of a specific user interface that may include one or more visual descriptors of the credential if the credential is in a life cycle state that is to be accessible to a user). Such commerce credential provisioning data 554 generated by financial institution subsystem 350 may be transmitted by financial institution subsystem 350 (e.g., by an appropriate payment network subsystem 360) to commercial entity subsystem 400 (e.g., to an SMP broker component of commercial entity subsystem 400) via communications path 55 of FIG. 1 using any suitable communications protocol over any suitable communications path type (e.g., via a TSM of communications path 55) and then such commerce credential provisioning data 554 may be passed on by commercial entity subsystem 400 to device 100 via communications path 65 of FIG. 1 using any suitable communications protocol over any suitable communications path type (e.g., via a TSM of communications path 65).

System 1 and/or process 500 may be configured to provision a virtual credential on device 100 rather than the actual credential that may be initially requested for provisioning at step 503. For example, once it is determined that a credential is to be provisioned on device 100, it may be requested (e.g., by financial institution subsystem 350, by commercial entity subsystem 400 at step 503, and/or by a user of device 100 at step 503) that a virtual credential be generated, linked to the actual credential, and provisioned on device 100 instead of the actual credential identified at step 503. That is, commercial entity subsystem 400 may generate and transmit credential provisioning instruction data to financial institution subsystem 350 at step 503 that may also include a specific instruction for financial institution subsystem 350 to create a new virtual credential (e.g., a device primary account number ("D-PAN")), link that virtual credential with the selected actual credential (i.e., a funding primary account number ("F-PAN") originally issued by the issuing bank), and then provision that virtual credential onto device 100. Accordingly, in such embodiments, financial institution subsystem 350 may generate and transmit commerce credential provisioning data 554 at step 504 that may include a descriptor of the virtual credential (e.g., the D-PAN) to be provisioned and any suitable metadata that ought to be provided on device 100 for aiding user interaction with the virtual credential to be provisioned. Such linking or other suitable association of a virtual credential with an actual credential may be performed by any suitable component of financial institution subsystem 350. For example, financial institution subsystem 350 (e.g., a particular payment network subsystem 360 that may be associated with the brand of the actual credential identified at step 503) may define and store an entry in a virtual-linking table or data structure 352 (e.g., as shown in FIG. 1) at step 504 of process 500, where such an entry may create an association or link between the actual credential and a virtual credential. Thus, when a virtual credential is utilized by device 100 for a financial transaction with merchant subsystem 200 (e.g., after the virtual credential has been provisioned on device 100), financial institution subsystem 350 may receive an authorization request indicative of that virtual credential (e.g., as data 395 from acquiring bank subsystem 300, described below) and may conduct an analysis of that authorization request in light of the actual credential associated or otherwise linked with the identified virtual credential as determined by virtual-linking table 352. Additionally or alternatively, table 352 may include data associating a credential (e.g., a virtual credential and/or an actual credential) with a particular electronic device 100 or at least a particular secure element 145 of a device 100 on which that credential is provisioned. Thus, when a list of credentials provisioned on a device 100 is provided to financial institution subsystem 350 (e.g., as described below with respect to step 522), financial institution subsystem 350 may confer with data entries of table 352 to determine if one or more credentials previously provisioned on device 100 by financial institution subsystem 350 has been deleted (e.g., as described below with respect to step 524).

By provisioning a virtual credential on device 100 rather than an actual credential, financial institution subsystem 350 may be configured to limit the fraudulent activity that may result if the virtual credential is intercepted by an unauthorized user (e.g., by an NFC communication 15 signal stealer positioned adjacent device 100 and/or merchant terminal 220), as financial institution subsystem 350 (e.g., payment network subsystem 360) may only be configured to utilize virtual-linking table 352 for linking the virtual credential to the actual credential during certain transactions (e.g., during NFC transactions received by merchant terminal 220 and not during online transactions or other transactions that may allow credential information to be manually entered by a user). Therefore, in such embodiments using a virtual credential, commerce credential provisioning data 554 generated by financial institution subsystem 350 may contain a new D-PAN (e.g., new virtual credential information) from an entry in table 352 that may define a link between an F-PAN (e.g., an actual credential banking number) of the selected credential identified at step 503 and this new D-PAN. Commerce credential provisioning data 554 may also include the last four digits or any other suitable data of the linked F-PAN for creating a hashed version of the F-PAN. Providing both the virtual D-PAN and a hashed version of the actual F-PAN on device 100 may prevent user confusion between the two and may enable easier user association of the two when utilizing a virtual credential for a financial transaction. Therefore, in some embodiments, a full version of an F-PAN (e.g., an actual credential banking number) may never be stored on device 100, but rather only an associated D-PAN (e.g., a linked virtual credential) may be stored in non-hashed form on device 100. Commerce credential provisioning data 554 may also include a unique D-PAN hash (e.g., the last four digits of the D-PAN and/or any other suitable data for creating a hashed version of the D-PAN that may be used in all subsequent calls to reference this D-PAN while maintaining security of the D-PAN). Commerce credential provisioning data 554 may also include an "AuthToken" or any other suitable token that may be a one-time use token for enabling provision of the credential. Commerce credential provisioning data 554 may also include put pending command data that may include the primary account number (e.g., D-PAN or F-PAN, hashed or not) of the credential being provisioned, an SSD identifier, and/or an SSD counter.

As mentioned, commercial entity subsystem 400 (e.g., an SMP broker component and/or an SMP-TSM component of commercial entity subsystem 400) may pass commerce credential provisioning data 554 onto device 100 as part of step 504, where such commerce credential provisioning data 554 may include any suitable description or identification of the credential to be provisioned (e.g., a hashed-version of the credential's PAN, virtual and/or actual (e.g., D-PAN and/or F-PAN)), as well as any associated metadata. Such commerce credential provisioning data 554 may also include one or more persoScripts or GlobalPlatform application protocol data unit ("APDU") scripts (e.g., any scripts, any rotate keys (e.g., if necessary), and any other suitable administrative elements that may be used to provision a usable PAN on device 100). Such commerce credential provisioning data 554 may also include information associated with the particular SSD 154 of device 100 that may have the credential provisioned thereon (e.g., an SSD identifier of a particular SSD 154, as may be provided by step 503). Such commerce credential provisioning data 554 may be transmitted by commercial entity subsystem 400 to electronic device 100 via communications path 65 of FIG. 1. For example, communications component 106 of electronic device 100 may be configured to receive commerce credential provisioning data 554 using any suitable communications protocol over any suitable communications path 65. In some embodiments, commerce credential provisioning data 554 may be transmitted by commercial entity subsystem 400 to device 100 as encrypted with ISD key 155*i* as may be accessible to both commercial entity subsystem 400 and ISD 152 of device 100. Alternatively or additionally, at least some of commerce credential provisioning data 554 may be provided to electronic device 100 directly from financial institution subsystem 350 at step 504 (e.g., via communications path 75 of FIG. 1, where communications component 106 of electronic device 100 may be configured to receive commerce credential provisioning data 554 using any suitable communications protocol over any suitable communications path 75). Commerce credential provisioning data 554 may be generated and transmitted by financial institution subsystem 350 as encrypted with an SSD key 155*a* of the target SSD 154*a* and/or with a credential applet key 155*aa* of the new commerce credential applet 153*a* being provisioned at step 504, where SSD key 155*a* and/or credential applet key 155*aa* may be accessible to financial institution subsystem 350 (e.g., as shown in FIG. 1). By encrypting at least some of commerce credential provisioning data 554 using an SSD key 155*a* and/or a credential applet key 155*aa* that may be known to financial institution subsystem 350 but not to commercial entity subsystem 400, at least some of the information of commerce credential provisioning data 554 may be inaccessible to commercial entity subsystem 400 even if that commerce credential provisioning data 554 may be passed through commercial entity subsystem 400 from financial institution subsystem 350 to device 100 at step 504.

After step 504, once commerce credential provisioning data 554 has been received by electronic device 100, device 100 may be configured to complete any of the received scripts from commerce credential provisioning data 554 of step 504 and/or take any other suitable action for enabling the credential (e.g., for toggling the credential from a disabled state to an enabled state) at step 505 of process 500, such that the actual credential identified at step 503 may have an associated commerce credential applet 153 (e.g., commerce credential applet 153*a* of SSD 154*a*) enabled on secure element 145 for eventual use in an NFC communication 15 for a financial transaction. SSD 154*a* may also be provisioned on secure element 145 along with commerce credential applet 153*a* based on commerce credential provisioning data 554 of step 504. Alternatively, SSD 154*a* may have been previously created on secure element 145, such that only commerce credential applet 153*a* and not SSD 154*a* may be provisioned on secure element 145 based on commerce credential provisioning data 554 of step 504. Once a new commerce credential applet 153*a* has been provisioned on SSD 154*a* of secure element 145 of device 100 at step 504, SSD 154*a* may include SSD key 155*a* and SSD life cycle state 157*a*, while commerce credential applet 153*a* may include applet key 155*aa* and applet life cycle state 157*aa*. At step 506 of process 500, CRS list 151 of CRS application 153*i* may be updated (e.g., by ISD 152) to reflect the new life cycle states of secure element 145 (e.g., at least the new life cycle state 157*aa* of new commerce credential applet 153*a* as just provisioned on device 100 at step 504/505). For example, in some embodiments, the initial life cycle state 157*aa* of a commerce credential applet 153*a* provisioned on a secure element may be configured to be enabled but "DEACTIVATED" at step 505 and reflected as such in CRS list 151 at step 506, whereby a user of device 100 may later activate the commerce credential applet 153*a* for use in an NFC communication 15 (e.g., update life cycle state 157*aa* of commerce credential applet 153*a* to "ACTIVATED"). After CRS list 151 has been updated at step 506 to reflect the life cycle state of the newly provisioned commerce credential applet 153*a*, process 500 may proceed to step 508, where at least certain data from CRS list 151 of secure element 145 may be shared with processor 102 of device 100 (e.g., with SELD application 113*a*) as shared CRS list data 558, and where at least certain information of shared CRS list data 558 may be selectively shared by SELD application 113*a* with UI application 113*b* as shared user CRS list data 558', which may then be selectively provided by UI application 113*b* as output information 1150 to a user of device 100 (e.g., via I/O interface 114*a* or any other suitable output component of device 100, as shown in FIG. 4). Device 100 may then be used at step 509 (e.g., by a user interacting with UI application 113*b* through the use of user input information 115*i*) to change the life cycle state of a credential provisioned on secure element 145 (e.g., life cycle state 157*aa* of commerce credential applet 153*a*) to "ACTIVATED" for use in one or more ways (e.g., for use in an NFC communication 15 with merchant subsystem 200 in a financial transaction, as described below in more detail). For example, the visual artwork and/or other metadata of commerce credential provisioning data 554 that may be provided on device 100 at step 504 for aiding user interaction with a provisioned credential may be used at step 509 for identifying the credential to a user as output information 115*o*.

As mentioned, process 500 may be configured to allow an electronic device to mark a commerce credential or other security domain element for deletion without requiring authentication and/or secure channel setup and/or network connectivity with a trusted service manager (e.g., with SEI-TSM commercial entity subsystem 400 and/or with SP-TSM financial institution subsystem 350). Device 100 may be configured to transition one or more certain security domain elements of NFC component 120 (e.g., SSDs 154*a* and 154*b* and/or credential applets 153*a*, 153*a'*, 153*b*, and 153*b'*) to a new life cycle state "ELEMENT_TERMINATED" that may make that element unusable. This ELEMENT_TERMINATED life cycle state may be similar to a "LOCKED" state that may already be covered by GlobalPlatform, however the transition to the ELEMENT_TERMINATED state may be irreversible and may act as a permanent local disable or mark-for-delete functionality that may thereafter make the security domain element unusable. Then, at any time after the life cycle state for a particular security domain element has been transitioned to ELEMENT_TERMINATED, the owner or trusted service manager of the security domain of that transitioned element, who may have content management privileges for that security domain, may later delete the transitioned element according to any suitable protocol (e.g., according to GlobalPlatform, for example, by setting up a secure channel path between device 100 and the TSM, and then issuing a DELETE command) or may in any other suitable way reconcile the permanent disablement of the credential. Therefore, a security domain element (e.g., a provisioned credential) may be permanently disabled on device 100 without requiring network connectivity between device 100 and a TSM (e.g., financial institution subsystem 350 and/or commercial entity subsystem 400 sharing a key with the security domain element) at the time of permanent disablement. This may enable a user to remove a credential's functionality from device 100 permanently without first establishing a network connection between device 100 and a remote subsystem. This may be beneficial when a first user would like to remove certain credentials from device 100 before selling device 100 to a second user despite no network connectivity between device 100 and a trusted service manager.

Before a life cycle state of a security domain element of device 100 may be transitioned to such an ELEMENT_TERMINATED state, that security domain element must first be configured to even allow such a transition. That is, some or all security domain elements of device 100 may each be configured to include a data field or any other suitable feature that can be set either to allow the security domain element to be transitioned to an ELEMENT_TERMINATED state or to prevent the security domain element from being transitioned to an ELEMENT_TERMINATED state. For example, some or all security domain elements of secure element 145 of device 100 may be configured to include a flag or bit register or any other suitable functionality data register 159 that may be set for either allowing or preventing such a transition. For example, as shown in FIG. 4, security domain element ISD 152 or CRS application 153*i* may include a functionality data register 159*i*, security domain element SSD 154*a* may include a functionality data register 159*a*, security domain element credential applet 153*a* may include a functionality data register 159*aa*, security domain element credential applet 153*a'* may include a functionality data register 159*aa'*, security domain element SSD 154*b* may include a functionality data register 159*b*, security domain element credential applet 153*b* may include a functionality data register 159*ba*, and/or security domain element credential applet 153*b'* may include a functionality data register 159*ba'*, where the functionality data register 159 of each security domain element may be independently set to either allow or prevent a transition of the life cycle state 157 of that security domain element to the ELEMENT_TERMINATED state.

Whether the functionality data register 159 of a particular security domain element is set to allow or prevent such a life cycle state transition may be determined by the manager of that security domain element and may not be changed by a user of device 100. In some embodiments, the functionality data register 159 of a security domain element may be set when that security domain element is installed or otherwise provisioned on device 100. For example, functionality data register 159*i* of CRS application 153*i* of ISD 152 may be set by commercial entity subsystem 400 at step 502 of process 500 when initial credential management data 552 is provided to device 100. Additionally or alternatively, as another example, functionality data register 159*aa* of credential applet 153*a* may be set by financial institution subsystem 350 or commercial entity subsystem 400 at step 504 of process 500 when commerce credential provisioning data 554 is provided to device 100. In some embodiments, functionality data register 159*i* of CRS application 153*i* may be set (e.g., to a bit value "0") so as to prevent CRS application 153*i* from being transitioned to an ELEMENT_TERMINATED state, while functionality data register 159*aa* of credential applet 153*a* may be set (e.g., to a bit value "1") so as to allow life cycle state 157*aa* of credential applet 153*a* to be transitioned to an ELEMENT_TERMINATED state. Other components of secure element 145 may also be configured to be prevented from being transitioned to an ELEMENT_TERMINATED state, such as a controlling authority security domain ("CASD") (not shown). Moreover, in some particular embodiments, a life cycle state of a particular SSD may be prevented from transitioning to an ELEMENT_TERMINATED state while a life cycle state of a particular credential applet of that SSD may be allowed to transition to an ELEMENT_TERMINATED state. For example, functionality data register 159*a* of SSD 154*a* may be set (e.g., to a bit value "0") so as to prevent SSD 154*a* from being transitioned to an ELEMENT_TERMINATED state, yet functionality data register 159aa of credential applet 153a of SSD 154a may be set (e.g., to a bit value "1") so as to allow life cycle state 157aa of credential applet 153a to be transitioned to an ELEMENT_TERMINATED state, while functionality data register 159aa' of credential applet 153a' of SSD 154a may be set either to allow or prevent the transition of life cycle state 157aa' of credential applet 153a' to an ELEMENT_TERMINATED state.

As one particular example, a functionality data register 159 of a security domain element of device 100 may be set in the "Extended Functionality Indicator," as may be stored in "Application Discretionary Data" of the contactless parameters in the "User Interaction Parameters", where GlobalPlatform may define such Application Discretionary Data to be used by a CRS application (see, e.g., GlobalPlatform Technical Specification 2.2.1, v1.1, which is hereby incorporated by reference herein in its entirety). Such Application Discretionary Data may be wrapped inside constructed basic encoding rules ("BER") tag 0xA6 (see, e GlobalPlatform Technical Specification 2.2.1, v1.1, Amendment C, Table 3-13, which is hereby incorporated by reference herein in its entirety). As a specific example, bit 2 of byte 1 (least significant bit ("LSB")) of the Extended Functionality Indicator of a specific security domain element may be set either to "0" (e.g., not set) for preventing the transition of the life cycle state of that security domain element to ELEMENT_TERMINATED or to "1" (e.g., set) for allowing the transition of the life cycle state of that security domain element to ELEMENT_TERMINATED. When the functionality data register of a security domain element is set by a trusted service manager at install of the security domain element, the content management privileges of such a trusted service manager (e.g., financial institutions subsystem 350 and/or commercial entity subsystem 400) may require or otherwise utilize authentication and a secure channel for ensuring the authenticity and integrity of the functionality data register value. CRS application 153i and/or any other application of secure element 145 (e.g., NFC application 143) may leverage the functionality data register of security domain elements while processing life cycle state update requests. For example, CRS list 151 may not only include state information for the life cycle state of some or all security domain elements of device 100, but CRS list 151 may also include state information for the functionality data register of some or all of those security domain elements as well, such that shared CRS list data 558 or any other data indicative of CRS list 151 may indicate not only the life cycle state of a security domain element but also whether or not that security domain element is able to be transitioned to the ELEMENT_TERMINATED state.

At some point during the life of a security domain element on device 100, CRS application 153i may be instructed (e.g., by processor 102) to transition the life cycle state of the security domain element to ELEMENT_TERMINATED. For example, at step 510 of process 500, a user of device 100 may interact with UI application 113b (e.g., with input information 115i via I/O interface 114a) to instruct device 100 to transition the life cycle state of a particular security domain element to ELEMENT_TERMINATED. As mentioned, this may be desirable by a user when he or she wishes to sell or otherwise transfer device 100 to a new person who should not have access to one or more commerce credentials on device 100, especially when device 100 is not communicatively connected to a trusted service manager of that commerce credential at the time of the transfer. Such a user instruction may be provided by UI application 113b to SELD application 113a as state transition request data 562, which may then be communicated to CRS application 153i at step 512 of process 500. Alternatively or additionally, such a user instruction may not specifically identify a specific security domain element but instead the user instruction may be a more generic "clear all personal information" command that may have implications across multiple applications and not just for SELD application 113a and CRS application 153i. Alternatively or additionally, such an instruction may be generated automatically by an application of device 100 in response to a particular condition and not in response to a particular user interaction. Next, at step 514 of process 500, ISD 152 (e.g., CRS application 153i) may process state transition request data 562 and potentially update the life cycle state of a particular security domain element to ELEMENT_TERMINATED by transmitting suitable life cycle state update data 564 to the particular security domain element. For example, CRS application 153i may process state transition request data 562 to determine whether the particular security domain element indicated by state transition request data 562 is able to be transitioned to the ELEMENT_TERMINATED state (e.g., by identifying the state information for the functionality data register of that particular security domain element) and, if so, then transmit suitable life cycle state update data 564 to that particular security domain element for updating the life cycle state of that security domain element to ELEMENT_TERMINATED. No access control (e.g., secure channel between device 100 and the TSM of the security domain element to be transitioned) may be required to issue the command of life cycle update data 564 of step 514. That is, the communicative coupling between financial entity subsystem 350 and device 100 required at step 504 for the provisioning of the security domain element on device 100 may be terminated or otherwise non-existent during step 510, 512, and/or step 514. The state of a security domain element may be transitioned to the ELEMENT_TERMINATED state locally on device 100 without requiring any communication between device 100 and a trusted service manager. UI application 113b may leverage previously shared CRS list data 558 (e.g., from step 508) to determine which security domain elements of device 100 are able to be transitioned to the ELEMENT_TERMINATED state (e.g., based on state information for the functionality data register of some or all of the security domain elements) and may only enable a user to select from those particular security domain elements for instructing device 100 to transition the state of a security domain element to ELEMENT_TERMINATED at step 510. Alternatively, UI application 113b may enable a user to select from all security domain elements for instructing device 100 to transition the state of a security domain element to ELEMENT_TERMINATED at step 510, and only ISD 152 at step 514 may determine whether or not to allow state transition request data 562 to trigger a state transition to ELEMENT_TERMINATED through analysis of the state information for the functionality data register of the identified security domain element.

State transition request data 562 may be configured to identify any suitable security domain element for transitioning to the ELEMENT_TERMINATED state. For example, state transition request data 562 may request that life cycle state 157aa of credential applet 153a be transitioned to ELEMENT_TERMINATED state. If the state of functionality data register 159aa of credential applet 153a indicates the allowance of such a state change, ISD 152 may update life cycle state 157aa of credential applet 153a to ELEMENT_TERMINATED at step 514. As another example, state transition request data 562 may request that life cycle state 157a of SSD 154a be transitioned to ELEMENT_TERMINATED state. If the state of functionality data register 159a of SSD 154a indicates the allowance of such a state change, ISD 152 may update life cycle state 157a of SSD 154a to ELEMENT_TERMINATED at step 514. Such a transition may be configured to consequently transition the life cycle state of each security domain element within SSD 154a to ELEMENT_TERMINATED as well (e.g., both life cycle state 157aa of credential applet 153a and life cycle state 157aa' of credential applet 153a' of SSD 154a may also be updated to ELEMENT_TERMINATED in response to such state transition request data 562 for SSD 154a). Therefore, the life cycle state of either a specific credential applet or an entire SSD may be transitioned to ELEMENT_TERMINATED at step 514. In other embodiments, only particular applets of or associated with an SSD may be transitioned to a terminated state while the SSD itself may remain on the secure element and not be transitioned to a terminated state.

In particular embodiments, process 500 may be configured to utilize a proprietary or otherwise new life cycle state ELEMENT_TERMINATED through using a unique coding structure that may be accessible to applicable standards (e.g., to GlobalPlatform Technical Specification 2.2.1, v1.1). For example, life cycle state coding may be coded bitwise and, in order to avoid conflict with any existing valid life cycle states, the new ELEMENT_TERMINATED life cycle state may use a coding of "10000001" for bits 8-1, where other existing valid life cycle states may include coding of "00000011" for an "INSTALLED" state, "00000111" for a "SELECTABLE" state, "0XXXX111" for application-specific states, and "1XXXXX11" for a "LOCKED" state. In some embodiments, device 100 may be configured to treat a security domain element in the ELEMENT_TERMINATED state as if it were in the LOCKED state except that any attempt to transition the state from ELEMENT_TERMINATED to a different state shall fail. Device 100 may be configured to transition the life cycle state of a security domain element to the ELEMENT_TERMINATED state through an application using GlobalPlatform Technical Specification 2.2.1's application programming interface ("API") "GPRegistryEntry method setState( )". For example, an application requesting this state transition (e.g., CRS application 153i) may be configured to have the "Global Registry and Contactless Activation" privilege. A limitation of such a "GPRegistryEntry method setState( )" may be extended to include this new ELEMENT_TERMINATED state, where a transition request to a state other than LOCKED, UNLOCKED, and ELEMENT_TERMINATED may only be accepted if the invoking application corresponds to this GPRegistryEntry. Device 100 may be configured to make possible a transition to the ELEMENT_TERMINATED state from most or all original life cycle states, including from the LOCKED state to the ELEMENT_TERMINATED state. In response to receiving a "SET STATUS" command (e.g., from SELD application 113a), CRS application 113i may not be configured to support transitioning a security domain element to the ELEMENT_TERMINATED state. Device 100 may be configured to apply one or more certain limitations to a requested transition of a particular security domain element's life cycle state to ELEMENT_TERMINATED. For example, if any application currently running on device 100 (e.g., at the initiation of step 514) is referencing the security domain element (e.g., through an internal interface), then device 100 may be configured to prevent that security domain element from transitioning to the ELEMENT_TERMINATED state. It is also to be understood that, in some embodiments, it may be possible to transition globally all applications (e.g., applets) with a single command that may transition each application to the ELEMENT_TERMINATED state if that application is capable of doing so (e.g., is in a PERSONALIZED life cycle).

Next, at step 516 of process 500, CRS list 151 of CRS application 153i may be updated (e.g., by ISD 152) to reflect the new life cycle states of secure element 145 (e.g., at least the new ELEMENT_TERMINATED life cycle state of the particular security domain element identified by data 562 and 564). After CRS list 151 has been updated at step 516 to reflect the life cycle state of the newly terminated security domain element, process 500 may proceed to step 518, where at least certain data from CRS list 151 of secure element 145 may be shared with processor 102 of device 100 (e.g., with SELD application 113a) as shared CRS list data 568, and where at least certain information of shared CRS list data 568 may be selectively shared by SELD application 113a with UI application 113b as shared user CRS list data 568', which may then be selectively provided by UI application 113b as output information 115o to a user of device 100 (e.g., via I/O interface 114a or any other suitable output component of device 100, as shown in FIG. 4). Device 100 may then be used at step 520 (e.g., by a user interacting with UI application 113b through the use of user input information 115i) to manage commerce credentials of device 100 in one or more ways. For example, a user may interact with UI application 113b and output information 115o to provide new input information 115i for selecting a credential application for use in a financial transaction at step 520.

As mentioned, device 100 may be configured to treat a security domain element in the ELEMENT_TERMINATED state as if it is in the LOCKED state except that any attempt to transition the state from ELEMENT_TERMINATED to a different state shall fail. However, in some embodiments, device 100 may be configured to prevent any indication of a security domain element that is in the ELEMENT_TERMINATED state to a user of device 100. For example, if life cycle state 157aa of credential applet 153a is transitioned to the ELEMENT_TERMINATED state at step 564 and shared CRS list data 568 indicates this status to processor 102 at step 518, UI application 113b may be configured to never present any information indicative of credential applet 153a to a user of device 100 from that point forward (e.g., as output information 115o at step 520). That is, although output information 115o may have been indicative of credential applet 153a at step 509 where a user may have selected and activated that credential applet 153a for use in a financial transaction and/or at step 510 where a user may have selected that credential applet 153a for transitioning to the ELEMENT_TERMINATED state, once its state has been transitioned to ELEMENT_TERMINATED, all information indicative of the existence of credential applet 153a on device 100 may be permanently prevented from being shared with a user of device 100 (e.g., as output information 1150 by UI application 113b via I/O interface 114a at step 520). Such indicative information may include all visual artwork and/or other metadata described above for a provisioned credential at step 504. In some embodiments, SELD application 113a may be configured to detect which security domain elements are in the ELEMENT_TERMINATED state (e.g., through analysis of shared CRS list data 568) and may only pass on shared user CRS list data 568' information to UI application 113b (see, e.g., FIG. 4) that is indicative of security domain elements that are not in the ELEMENT- _TERMINATED state. That is, SELD application 113a may be configured to prevent UI application 113b from receiving any information from secure element 145 related to any security domain element that is in the ELEMENT_TERMINATED state. In other embodiments, UI application 113b may be configured to receive CRS list data 568' that is the same as CRS list data 568 received by SELD application 113a, and UI application 113b may be configured to prevent the presentation of information to a user that is indicative of a security domain element that is in the ELEMENT_TERMINATED state. Moreover, if a security domain element in the ELEMENT_TERMINATED state offers an internal interface (e.g., through a shareable interface object ("SIO")), device 100 may be configured to make such an internal interface no longer functional once the security domain element transitions to the ELEMENT_TERMINATED state. It is also to be noted that the only supported SD command targeting a security domain element that is in the ELEMENT_TERMINATED state may be the DELETE command.

At some point after step 518, process 500 may proceed to step 522 where electronic device 100 may be communicatively coupled to a trusted service manager of the security domain element whose state was transitioned to ELEMENT_TERMINATED at step 514. For example, if credential applet 153a was transitioned to the ELEMENT_TERMINATED state at step 514, step 522 may include electronic device 100 being communicatively coupled to financial institution subsystem 350 (e.g., directly via communications path 75 or indirectly through commercial entity subsystem 400 via communications paths 65 and 55). Such a communicative coupling may occur for any suitable reason (e.g., at the request of financial institution subsystem 350, commercial entity subsystem 400, and/or device 100). When such a communicative coupling is made, shared TSM data 572 may be communicated from device 100 to the communicatively coupled TSM at step 522 (e.g., directly via communications path 75 or indirectly through commercial entity subsystem 400 via communication paths 65 and 55). Such shared TSM data 572 may include any suitable data that may be appropriate to share with the communicatively coupled TSM (e.g., financial institution subsystem 350). For example, shared TSM data 572 may at least include information that identifies electronic device 100 (e.g., secure element 145) and information indicative of data in the current CRS list 151 of device 100. Particularly, processor 102 (e.g., SELD application 113a) may be configured to leverage most recently shared CRS list data 568 to generate and transmit shared TSM data 572 that may be indicative of at least the life cycle states of the security domain elements of device 100 that are managed by the communicatively coupled TSM. That is, TSM data 572 may include information indicative of the ELEMENT_TERMINATED state of applet credential 153a if such a state was transitioned to at step 514. In response to receiving a "GET STATUS" command (e.g., from SELD application 113a), CRS application 113i may be configured to include the ELEMENT_TERMINATED status of the security domain elements currently in that life cycle state (e.g., in any shared CRS list data 558/568). Device 100 may be configured to communicate shared TSM data 572 at step 522 automatically in response to being communicatively coupled to a TSM. Alternatively, device 100 may be configured to communicate shared TSM data 572 in response to a request for such data that may be made by the TSM in response to being communicatively coupled to device 100.

In response to receiving shared TSM data 572 at step 522, the communicatively coupled TSM may process the received TSM data at step 524 of process 500. For example, financial institution subsystem 350 may analyze shared TSM data 572 in any suitable way at step 524 to determine whether any security domain element of device 100 managed by financial institution subsystem 350 has had its life cycle state transitioned to ELEMENT_TERMINATED. If such a determination is made, financial institution subsystem 350 may reconcile this transition by updating any suitable data maintained by financial institution subsystem 350. For example, if a commerce credential applet defined by a virtual commerce credential (e.g., a D-PAN) has been transitioned to the ELEMENT_TERMINATED state on device 100, financial institution subsystem 350 may be configured to update virtual-linking table 352 at step 524 to remove the link for that virtual commerce credential (e.g., such that the virtual credential may be linked to another actual credential and provisioned on another electronic device). Then, at step 526 of process 500, financial institution subsystem 350 may be configured to share TSM response data 576 with device 100 based on the analysis of step 524 (e.g., directly via communications path 75 or indirectly through commercial entity subsystem 400 via communication paths 55 and 65). For example, in response to financial entity subsystem 350 determining at step 524 that a particular security domain element of device 100 managed by financial institution subsystem 350 has had its life cycle state transitioned to ELEMENT_TERMINATED, financial institution subsystem 350 may generate and transmit TSM response data 576 that may be configured to delete or otherwise complete the termination of that particular security domain element from device 100 (e.g., TSM response data 576 may include a "DELETE" SD command that may be supported by GlobalPlatform). As shown in FIG. 4, such TSM response data 576 may be received by device 100 (e.g., via communications component 106 from communications paths 65 or 75 of FIG. 1) and processor 102 (e.g., SELD application 113a) may pass such TSM response data 576 on to ISD 152 (e.g., CRS application 153i).

Next, in response to receiving TSM response data 576 at step 526, ISD 152 may process and act on that received TSM response data at step 528. For example, at step 528, ISD 152 (e.g., CRS application 153i) may process received TSM response data 576 and potentially delete or otherwise complete the termination of a particular security domain element currently in the ELEMENT_TERMINATED state by transmitting suitable delete element data 578 to the particular security domain element. For example, ISD 152 may process TSM response data 576 (e.g., to determine if the transmitting TSM (e.g., financial institution subsystem 350 has authority to delete the indicated security domain element) and, if appropriate, then transmit suitable delete element data 578 to that particular security domain element for deleting that security domain element from secure element 145. Also, at step 530 of process 500, CRS list 151 of CRS application 153i may be updated (e.g., by ISD 152) to reflect the fact that a security domain element has been removed from secure element 145 such that CRS list 151 may remove any information regarding that security domain element.

Therefore, process 500 enables a security domain element (e.g., a commerce credential applet or an SSD) to be provisioned on device 100 (e.g., at step 504 during a first communication session between device 100 and a TSM), enables information indicative of that security domain element to be presented to a user of device 100 for aiding in the use or any other suitable management purpose of that security domain element (e.g., at steps 509 and 510), enables the life cycle state of that security domain element to be transitioned to an ELEMENT_TERMINATED state (e.g., at step 514) without device 100 being communicatively coupled to a TSM of that security domain element (e.g., after the first communication session between device 100 and the TSM has been terminated), prevents that security domain element from being utilized by and/or presented to a user of device 100 from that point on (e.g., at step 520), and then enables that security domain element to be frilly deleted from device 100 when device 100 is eventually communicatively coupled to the TSM of that security domain element (e.g., at steps 522-528 during a second communication session between device 100 and the TSM that is different than the first communication session). This may enable a user of device 100 to believe that a security domain element has been completely removed from device 100 as soon as that security domain element has been transitioned to the ELEMENT_TERMINATED state at step 514, despite that security domain element not actually being completely removed from device 100 until the later step 528. However, in other embodiments, rather than updating the life cycle state of a security domain element to ELEMENT_TERMINATED at step 514 in response to state transition request data 562 requesting the deletion of that security domain element, step 514 may alternatively include actually deleting the security domain element (i.e., rather than waiting to do so at a much later point in time at step 528 in response to TSM response data 576 received from a communicatively coupled TSM). Then, in such instances, step 516 may include updating CRS list 151 to be indicative of that deletion (e.g., by completely removing any information regarding that deleted security domain element or by generating a message indicative of the deletion). Then, device 100 may still be configured to prevent any indication of that deleted security domain element to a user of device 100 at step 520 and shared TSM data 572 shared with a communicatively coupled TSM at step 522 may at least include information that identifies electronic device 100 (e.g., secure element 145) and information indicative of data in the current CRS list 151 of device 100. Particularly, processor 102 (e.g., SELD application 113a) may be configured to leverage most recently shared CRS list data 568 updated at step 516 to generate and transmit shared TSM data 572 that may either have no information regarding the security domain element deleted at step 514 or that may include a message indicative of the deletion of the security domain element at step 514. Then, in such a situation, financial institution subsystem 350 may analyze such shared TSM data 572 in any suitable way at step 524 to determine whether any security domain element of device 100 managed by financial institution subsystem 350 has been deleted from device 100 (e.g., by detecting such a message and/or by conferring with data entries of table 352 to determine if one or more credentials previously provisioned on device 100 by financial institution subsystem 350 is not identified in shared TSM data 572 (e.g., by determining that no life cycle state for the previously provisioned credential is indicated by shared TSM data 572)). If such a determination is made, financial institution subsystem 350 may reconcile this deletion by updating any suitable data maintained by financial institution subsystem 350. For example, if a commerce credential applet defined by a virtual commerce credential (e.g., a D-PAN) has been deleted from device 100 at step 514, financial institution subsystem 350 may be configured to update virtual-linking table 352 at step 524 to remove the link for that virtual commerce credential (e.g., such that the virtual credential may be linked to another actual credential and provisioned on another electronic device). When such a determination is made at step 524 that one or more credentials previously provisioned on device 100 by financial institution subsystem 350 has been deleted from device 100 at step 514, there may be no need for financial institution subsystem 350 to generate and transmit an TSM response data 576 to device 100 as described above with respect to step 526. Co-pending, commonly-assigned U.S. provisional patent application No. 61/923,312, filed Jan. 3, 2014, is hereby incorporated by reference herein in its entirety, and is directed towards disabling mobile payments for lost electronic devices.

It is understood that the steps shown in process 500 of FIG. 5 are merely illustrative and that existing steps may be modified or omitted, additional steps may be added, and the order of certain steps may be altered.

Description of FIG. 6

FIG. 6 is a flowchart of an illustrative process 600. At step 602, process 600 may terminate (e.g., permanently) the functionality of a security domain element on an electronic device while the electronic device is not communicatively coupled to a trusted service manager of the security domain element. For example, as described above with respect to FIGS. 1-5, device 100 may be configured to transition the state of a security domain element to the ELEMENT_TERMINATED state without device 100 being communicatively coupled to any remote entity, such as financial institution subsystem 350 or commercial entity subsystem 400. As another example, as described above with respect to FIGS. 1-5, device 100 may be configured to delete a security domain element from device 100 without device 100 being communicatively coupled to any remote entity, such as financial institution subsystem 350 or commercial entity subsystem 400. Next, at step 604 of process 600, after the termination of step 602, the electronic device may be communicatively coupled to the trusted service manager and then, at step 606, data may be communicated from the electronic device to the communicatively coupled trusted service manager, where the communicated data may be usable by the trusted service manager to determine that the functionality of the security domain element has been terminated on the electronic device. For example, as described above with respect to FIGS. 1-5, once device 100 has disabled the functionality of a security domain element by transitioning it to the ELEMENT_TERMINATED state or by deleting it from device 100, device 100 may communicate shared TSM data with the trusted service manager (e.g., financial institution subsystem 350), where such shared TSM data may be used by the trusted service manager to detect that the functionality of the security domain element has been terminated (e.g., by indicating a transitioned state of the security domain element or by indicating nothing related to the security domain element).

It is understood that the steps shown in process 600 of FIG. 6 are merely illustrative and that existing steps may be modified or omitted, additional steps may be added, and the order of certain steps may be altered.

Further Description of FIG. 1

As mentioned, merchant terminal 220 may be provided by any suitable merchant of merchant subsystem 200 that may provide a product or service to a user of device 100 in response to device 100 providing payment credentials via communication 15 to terminal 220. Based on such a received NFC communication 15, merchant subsystem 200 may be configured to generate and transmit data 295 to acquiring bank subsystem 300 (e.g., via a communication path 25 between merchant subsystem 200 and acquiring bank subsystem 300), where data 295 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via NFC communication 15 with merchant subsystem 200. Acquiring bank subsystem 300 may then forward the authorization request from data 295 to financial institution subsystem 350 as data 395 (e.g., via a communication path 35 between acquiring bank subsystem 300 and financial institution subsystem 350). One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

As mentioned, payment network subsystem 360 and issuing bank subsystem 370 may be a single entity or separate entities. For example, American Express may be both a payment network subsystem 360 and an issuing bank subsystem 370. In contrast, Visa and MasterCard may be payment network subsystems 360, and may work in cooperation with issuing bank subsystems 370, such as Chase, Wells Fargo, Bank of America, and the like. In the case of payment network subsystem 360 and issuing bank subsystem 370 being separate entities, payment network subsystem 360 may receive the authorization request of data 395 from acquiring bank subsystem 300 and may then forward the request to issuing bank subsystem 370 as data 495 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 395 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

When issuing bank subsystem 370 receives an authorization request (e.g., directly from acquiring bank subsystem 300 as data 395 or indirectly via payment network subsystem 360 as data 495), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response 499 to acquiring bank subsystem 300 (i.e., as response 399 via payment network subsystem 360). However, if sufficient funds are present, issuing bank subsystem 370 may approve the requested transaction by transmitting a positive authorization response 499/399 to acquiring bank subsystem 300 and the financial transaction may be completed, while notification of the authorization response may be forwarded on to merchant subsystem 200 from acquiring bank subsystem 300 as data 299. Either type of authorization response may be provided by user financial subsystem 350 to acquiring bank subsystem 300 as authorization response data 399 (e.g., authorization response data 399 may be provided directly from issuing bank subsystem 370 to acquiring bank subsystem 300 via communication path 35, or authorization response data 399 may be provided from payment network subsystem 360 to acquiring bank subsystem 300 based on authorization response data 499 that may be provided to payment network subsystem 360 from issuing bank subsystem 370 via communication path 45).

As mentioned, although not shown, commercial entity subsystem 400 of FIG. 1 may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience when it is being determined whether or not to provision a credential from financial institution subsystem 350 on to device 100 and/or to remove a credential from device 100.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out credential provisioning operations on device 100 from financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1 and/or electronic device 100 via communications path 65 of FIG. 1).

Further Description of FIG. 2, FIG. 3, and FIG. 4

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 113. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications 15 between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 220 of merchant subsystem 200).

NFC component 120 may include any suitable modules for enabling contactless proximity-based communication 15 between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 15. Additionally or alternatively, NFC data module 132 may be configured to contain, route, or otherwise receive any suitable data that may be received by NFC component 120 from merchant subsystem 200 as part of a contactless proximity-based communication 15.

NFC transceiver or NFC antenna 134 may be any suitable antenna or other suitable transceiver circuitry that may generally enable communication of communication 15 from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 15 between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 15 to subsystem 200. For example, shared antenna 116 may require amplification from booster 136 before antenna 116 (e.g., a non-loop antenna) may be properly enabled for communicating contactless proximity-based or NFC communication 15 between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 15) from NFC tags (e.g., from merchant subsystem 200) to NFC data module 132, a peer-to-peer mode for exchanging data (e.g., communication 15) with another NFC enabled device (e.g., merchant subsystem 200), and a card emulation mode for allowing another NFC enabled device (e.g., merchant subsystem 200) to read information (e.g., communication 15) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 15 between electronic device 100 and merchant subsystem 200. NFC memory module 150 may be embedded within NFC device hardware or within an NFC integrated circuit ("IC"). NFC memory module 150 may be tamper resistant and may provide at least a portion of secure element 145. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of secure element 145, which may be tamper resistant. For example, such a secure element may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems.

As shown in FIGS. 2 and 4, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155a and 155b) and at least one of its own credential applications or credential applets (e.g., a Java card applet instances) associated with a particular commerce credential (e.g., credential applets 153a and 153a' of SSD 154a and credential applets 153b and 153b' of SSD 154b), where a credential applet may have its own applet key (e.g., applet key 155aa for credential applet 153a, applet key 155aa' for credential applet 153a', applet key 155ba for credential applet 153b, and applet key 155ba' for credential applet 153b') and where a credential applet may need to be activated to enable its associated commerce credential for use by NFC device module 130 as an NFC communication 15 between electronic device 100 and merchant subsystem 200. For example, a first payment network subsystem 360 (e.g., Visa) may be the TSM for first SSD 154a and the different applets 153a and 153a' of first SSD 154a may be associated with different commerce credentials managed by that first payment network subsystem 360, while a second payment network subsystem 360 (e.g., MasterCard) may be the TSM for second SSD 154b and the different applets 153b and 153b' of second SSD 154b may be associated with different commerce credentials managed by that second payment network subsystem 360, where one credential applet of an SSD can be deleted while another credential applet of that same SSD may be maintained. Alternatively, each credential applet 153 may be provided by its own SSD 154.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200 as NFC communication 15. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of secure element 145). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

While NFC component 120 has been described with respect to near field communication, it is to be understood that component 120 may be configured to provide any suitable contactless proximity-based mobile payment or any other suitable type of contactless proximity-based communication 15 between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 3, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 143) that may be displayed in all or some of the areas of display output component 112a. For example, as shown in FIG. 3, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner. For each application, screens may be displayed on display output component 112a and may include various user interface elements. Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 3, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 3). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-6 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 1100) may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112*a*) with graphical data to display a graphical user interface ("GUI") 180. GUI 180 may be configured to receive touch input via a touch input component 110*f* Embodied as a touch screen (e.g., with display output component 112*a* as I/O component 114*a*), touch I/O component 110*f* may display GUI 180. Alternatively, GUI 180 may be displayed on a display (e.g., display output component 112*a*) separate from touch input component 110*f* GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110*f,* which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for managing credentials on an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. An electronic device comprising:
   a secure element comprising a plurality of security domain elements stored on the secure element; and
   a processor component configured to:
   while the electronic device is not communicatively coupled to any trusted service manager, receive an instruction to delete a first security domain element of the plurality of security domain elements but not a second security domain element of the plurality of security domain elements, wherein the first security domain element was stored on the secure element with a particular value of a register for the first security domain element;
   based on the instruction, permanently terminate the functionality of the first security domain element but not the functionality of the second security domain element, while the electronic device is not communicatively coupled to any trusted service manager, by:
   detecting the particular value of the register for the first security domain element; and
   in response to the detecting, transitioning a life cycle state of the first security domain element from a first type of life cycle state to a second type of life cycle state, wherein the detected value of the register is configured to allow the transitioning;
   after the functionality of the first security domain element has been permanently terminated, communicatively couple the electronic device to a trusted service manager; and
   transmit data to the communicatively coupled trusted service manager that is usable by the trusted service manager to determine that the functionality of the first security domain element has been permanently terminated.

2. The electronic device of claim 1, wherein the permanent termination irreversibly prevents the electronic device from sharing information indicative of the first security domain element with a user of the electronic device.

3. The electronic device of claim 1, wherein the permanent termination irreversibly prevents the electronic device from sharing information indicative of the first security domain element with a merchant subsystem.

4. The electronic device of claim 1, wherein the permanent termination irreversibly prevents the electronic device from sharing information indicative of the first security domain element with each one of a user of the electronic device and a merchant subsystem.

5. The electronic device of claim 1, wherein the first security domain element is a commerce credential applet.

6. The electronic device of claim 1, wherein the first security domain element is a supplemental security domain.

7. The electronic device of claim 1, wherein the first security domain element comprises a first applet of a security domain on the secure element and the second security domain element comprises a second applet of the security domain.

8. The electronic device of claim 1, wherein the processor component is configured to permanently terminate the functionality of the first security domain element by deleting the first security domain element from the secure element while the electronic device is not communicatively coupled to any trusted service manager.

9. A financial institution system in communication with an electronic device, the financial institution system comprising:
   at least one processor component;
   at least one memory component; and
   at least one communications component, wherein the financial institution system is configured to:
   provision a security domain element on the electronic device;
   after the security domain element is provisioned on the electronic device but before any instruction is communicated from the financial institution system for permanently terminating the security domain element on the electronic device, receive shared data from the electronic device; and
   use the received shared data to determine that the functionality of the security domain element has been permanently terminated on the electronic device, wherein the financial institution system is configured to determine that the functionality of the security domain element has been permanently terminated on the electronic device by detecting the absence of any life cycle state of the security domain element in the received shared data.

10. The financial institution system of claim 9, wherein:
    the financial institution system is further configured to provision another security domain element on the electronic device; and
    the financial institution system is configured to determine whether the functionality of the other security domain element has been permanently terminated on the electronic device by detecting a life cycle state of the other security domain element in the received shared data.

11. The financial institution system of claim 10, wherein the financial institution system is further configured to transmit response data to the electronic device after detecting the life cycle state of the other security domain element in the received shared data.

12. The financial institution system of claim 11, wherein the response data comprises a command to delete the other security domain element from the electronic device.

13. The financial institution system of claim 9, wherein the financial institution system is configured to determine that the functionality of the security domain element has been deleted from the electronic device by detecting the absence of any life cycle state of the security domain element in the received shared data.

14. An electronic device comprising:
a secure element comprising a first security domain element and a second security domain element stored on the secure element, wherein the first security domain element comprises a register stored with a particular value; and
a processor component configured to:
while the electronic device is not communicatively coupled to a trusted service manager, irreversibly end an ability of the electronic device to share information indicative of the first security domain element, but not of the second security domain element, with at least one of a user of the electronic device or a remote merchant subsystem, wherein the processor component is configured to irreversibly end the ability by:
detecting the particular value of the register of the first security domain element; and
in response to the detecting, changing a life cycle state of the first security domain element from a first type of life cycle state to a second type of life cycle state, wherein the detected value of the register is configured to allow the changing;
after the ability has been irreversibly ended, communicatively couple the electronic device to the trusted service manager; and
transmit data to the communicatively coupled trusted service manager that is usable by the trusted service manager to determine that the ability has been irreversibly ended.

15. The electronic device of claim 14, wherein the data is indicative of a life cycle state of the first security domain element.

16. The electronic device of claim 14, wherein the data is not indicative of a life cycle state of the first security domain element.

17. The electronic device of claim 14, wherein the processor component is configured to irreversibly end the ability by deleting the first security domain element from the electronic device while the electronic device is not communicatively coupled to any trusted service manager.

18. The electronic device of claim 14, wherein:
the processor component is further configured to receive an instruction from the user of the electronic device that identifies the first security domain element but not the second security domain element; and
the processor component is configured to irreversibly end the ability in response to the received instruction.

19. The electronic device of claim 14, wherein the processor component is configured to irreversibly end the ability of the electronic device to share information indicative of the first security domain element by:
detecting a value of a functionality data register for the first security domain element; and
in response to the detecting, transitioning a life cycle state of the first security domain element from a first type of life cycle state to a permanently terminated life cycle state, wherein the detected value of the functionality data register is configured to allow the transitioning.

20. A method comprising:
detecting a particular value of a functionality data register of a first applet of a security domain on a secure element on an electronic device while the electronic device is not communicatively coupled to any trusted service manager of the security domain;
in response to the detecting, permanently terminating the functionality of a first applet of a security domain on a secure element on the electronic device while the electronic device is not communicatively coupled to any trusted service manager of the security domain, wherein the detected particular value of the functionality data register is configured to allow the terminating;
after the terminating, communicatively coupling the electronic device to a trusted service manager of the security domain; and
communicating data from the electronic device to the communicatively coupled trusted service manager, wherein the communicated data is usable by the trusted service manager to determine that the functionality of the first applet of the security domain has been permanently terminated on the electronic device and that the functionality of a second applet of the security domain has not been permanently terminated on the electronic device.

21. The method of claim 20, wherein the first applet comprises a commerce credential applet.

22. The method of claim 20, further comprising:
before the permanently terminating, communicatively coupling the electronic device to the trusted service manager;
before the permanently terminating, receiving the first applet on the electronic device from the communicatively coupled trusted service manager; and
before the permanently terminating but after the receiving, communicatively de-coupling the electronic device from the trusted service manager.

23. The method of claim 22, wherein the receiving further comprises receiving the functionality data register with the particular value that is configured to allow the transition of a life cycle state of the first applet from a first type of life cycle state to a permanently terminated life cycle state.

24. The method of claim 20, wherein the communicated data is indicative of a life cycle state of the first applet.

25. The method of claim 24, further comprising:
after the communicating, receiving shared data at the electronic device from the communicatively coupled trusted service manager; and
using the received shared data to delete the first applet from the electronic device.

26. The method of claim 20, wherein the communicated data is not indicative of a life cycle state of the first applet.

27. The method of claim 20, wherein the permanently terminating comprises deleting the first applet from the electronic device.

28. The method of claim 20, wherein the permanently terminating comprises transitioning a life cycle state of the first applet from a first type of life cycle state to a second type of life cycle state.

29. The method of claim 20, wherein the permanently terminating comprises:
detecting a value of a functionality data register for the first applet; and
in response to the detecting, transitioning a life cycle state of the first applet from a first type of life cycle state to a permanently terminated life cycle state, wherein the detected value of the functionality data register is configured to allow the transitioning.

30. A non-transitory computer-readable medium comprising computer-readable instructions recorded thereon for:

irreversibly terminating the functionality of a security domain element on an electronic device while the electronic device is not communicatively coupled to a trusted service manager of the security domain element;

after the irreversibly terminating, communicatively coupling the electronic device to the trusted service manager; and communicating data from the electronic device to the communicatively coupled trusted service manager, wherein the communicated data is usable by the trusted service manager to determine that the functionality of the security domain element has been irreversibly terminated, and wherein the communicated data comprises no information regarding the security domain element.

31. The non-transitory computer-readable medium of claim 30, wherein the irreversibly terminating comprises:

detecting a value of a functionality data register for the security domain element; and in response to the detecting, transitioning a life cycle state of the security domain element from a first type of life cycle state to a permanently terminated life cycle state, wherein the detected value of the functionality data register is configured to allow the transitioning.

32. An electronic device comprising:

a secure element comprising a first applet and a second applet of a security domain stored on the secure element, wherein the first applet was provisioned on the secure element with a particular value of a functionality data register for the first applet; and a processor component configured to permanently terminate the functionality of the first applet but not the second applet, without any communication between the electronic device and any remote entity of data operative to carry out the permanent termination, by:

detecting the particular value of the functionality data register for the first applet; and in response to the detecting, transitioning a life cycle state of the first applet from a first type of life cycle state to a permanently terminated life cycle state, wherein the detected value of the functionality data register is configured to allow the transitioning.

33. An electronic device comprising:

a secure element comprising a first applet and a second applet of a security domain stored on the secure element, wherein the first applet was provisioned on the secure element by a trusted service manager with a particular value of a functionality data register of the first applet; and a processor component configured to delete the first applet but not the second applet, independent of any communication between the electronic device and the trusted service manager of data operative to carry out the permanent termination, by:

detecting the particular value of the functionality data register for the first applet; and in response to the detecting, transitioning a life cycle state of the first applet from a first type of life cycle state to a permanently terminated life cycle state, wherein the detected particular value of the functionality data register is configured to allow the transitioning.

* * * * *